(12) United States Patent
Dippold et al.

(10) Patent No.: US 10,170,958 B2
(45) Date of Patent: Jan. 1, 2019

(54) BELT PULLEY ARRANGEMENT FOR A BELT DRIVE FOR DRIVING AUXILIARY UNITS OF A MOTOR VEHICLE, AND A METHOD FOR DRIVING A MOTOR VEHICLE AUXILIARY UNIT THAT IS CONNECTED BY MEANS OF A BELT PULLEY ARRANGEMENT

(71) Applicant: Schaeffler Technologies AG & Co. KG, Herzogenaurach (DE)

(72) Inventors: Oliver Dippold, Nuremberg (DE); Ralf Wagner, Obermichelbach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 700 days.

(21) Appl. No.: 14/766,865

(22) PCT Filed: Dec. 11, 2013

(86) PCT No.: PCT/DE2013/200358
§ 371 (c)(1),
(2) Date: Aug. 10, 2015

(87) PCT Pub. No.: WO2014/127755
PCT Pub. Date: Aug. 28, 2014

(65) Prior Publication Data
US 2016/0301282 A1    Oct. 13, 2016

(30) Foreign Application Priority Data
Feb. 20, 2013    (DE) .......................... 10 2013 202 699

(51) Int. Cl.
*H02K 7/10*    (2006.01)
*F16H 55/36*    (2006.01)
(Continued)

(52) U.S. Cl.
CPC ........... *H02K 7/1012* (2013.01); *B60K 25/00* (2013.01); *B60L 1/003* (2013.01); *F16H 55/36* (2013.01);
(Continued)

(58) Field of Classification Search
CPC ........ H02K 7/1012; H02K 49/02; H02K 1/17; H02K 7/08; H02K 7/1815; H02K 1/27; B60K 25/00; B60L 1/003; F16H 55/36
See application file for complete search history.

(56) References Cited

U.S. PATENT DOCUMENTS 5,442,248 A *  8/1995  Agnoff ................... B65G 23/08
                                                       310/67 R
6,582,333 B2     6/2003  Man et al.
(Continued)

FOREIGN PATENT DOCUMENTS

CN         101178099         5/2008
CN         101720396         6/2010
(Continued)

*Primary Examiner* — David J Hlavka
(74) *Attorney, Agent, or Firm* — Volpe and Koenig, P.C.

(57) ABSTRACT

A belt pulley arrangement for a belt drive for driving auxiliary units of a motor vehicle, comprising a belt pulley for introducing a torque that can be supplied by a traction mechanism, an output shaft for driving an auxiliary unit, particularly a coolant pump, an electric machine for transmitting torque between the belt pulley and the output shaft, the electric machine including a rotor connected to the belt pulley and a stator connected to the output shaft, and being able to be electrically connected to an electric energy source for the purpose of accelerating the output shaft and/or to an electric energy sink in order to decelerate the output shaft, a first rotational speed measurement device for detecting the time curve of the rotational speed of the belt pulley and/or a second rotational speed measurement device for detecting the time curve of the rotational speed of the output shaft, and (Continued)

a control device connected to the electric energy source and/or electric energy sink so as to control an output shaft rotational speed time curve by temporarily electrically connecting the energy source and/or energy sink in reaction to the rotational speed time curve that has been detected. The power flow between belt pulley and output shaft which can be influenced by the electric machine provides that the auxiliary unit that is connected via the output shaft does not have to be designed for the most unfavorable operating point. As a result, the auxiliary unit can have smaller dimensions which allows a reduction in the construction space for motor vehicle components and particularly in the construction space for motor vehicle auxiliary units which can be driven by the belt drive.

15 Claims, 4 Drawing Sheets

(51) Int. Cl.
| | | |
|---|---|---|
| *B60K 25/00* | (2006.01) | |
| *B60L 1/00* | (2006.01) | |
| *H02K 1/17* | (2006.01) | |
| *H02K 1/27* | (2006.01) | |
| *H02K 7/08* | (2006.01) | |
| *H02K 7/18* | (2006.01) | |
| *H02K 49/02* | (2006.01) | |

(52) U.S. Cl.
CPC ............... *H02K 1/17* (2013.01); *H02K 1/27* (2013.01); *H02K 7/08* (2013.01); *H02K 7/1815* (2013.01); *H02K 49/02* (2013.01)

(56) References Cited

U.S. PATENT DOCUMENTS

| | | | |
|---|---|---|---|
| 9,915,198 B2* | 3/2018 | Dippold | F02B 67/08 |
| 2002/0045508 A1* | 4/2002 | Man | B60K 6/365 |
| | | | 475/5 |
| 2005/0124446 A1* | 6/2005 | Iwasa | F04B 27/0895 |
| | | | 474/69 |
| 2008/0020887 A1* | 1/2008 | Moeller | F01P 5/12 |
| | | | 475/204 |
| 2008/0090686 A1 | 4/2008 | Gardelle et al. | |

FOREIGN PATENT DOCUMENTS

| | | |
|---|---|---|
| CN | 102725493 | 10/2012 |
| CN | 103210240 | 7/2013 |
| DE | 19801160 | 7/1999 |
| DE | 10148961 | 4/2002 |
| DE | 10214637 | 10/2002 |
| EP | 1120182 | 8/2001 |
| EP | 1253319 | 10/2002 |
| WO | 2005119023 | 12/2005 |

* cited by examiner

BELT PULLEY ARRANGEMENT FOR A BELT DRIVE FOR DRIVING AUXILIARY UNITS OF A MOTOR VEHICLE, AND A METHOD FOR DRIVING A MOTOR VEHICLE AUXILIARY UNIT THAT IS CONNECTED BY MEANS OF A BELT PULLEY ARRANGEMENT

FIELD OF THE INVENTION

Background

The invention relates to a belt pulley arrangement for a belt drive for driving auxiliary units of a motor vehicle and a method for driving a motor vehicle auxiliary unit that is connected by means of a belt pulley arrangement, with whose help a motor vehicle auxiliary unit, for example, a coolant pump, can be driven by means of a traction mechanism with the help of a torque provided by a motor vehicle motor.

From DE 101 48 961 A1, a belt drive with an input belt pulley for driving auxiliary units is known that is connected by means of a planetary gear to a crankshaft of the internal combustion engine, wherein various auxiliary units can be driven by means of the traction mechanism driven by the belt pulley by means of output belt pulleys. In addition, an electric machine is connected to the traction mechanism by means of another output belt pulley, in order to generate electrical energy in the generator mode from the mechanical energy of the traction mechanism or to be able to supply an additional torque contribution into the traction mechanism in the motor mode.

There is a constant need for reducing the installation space for motor vehicle components.

SUMMARY

The object of the invention is to provide measures that enable a reduction of the installation space for motor vehicle components, in particular, the installation space of motor vehicle auxiliary units that can be driven by means of a belt drive.

The object is achieved according to the invention by a belt pulley arrangement and also a method for driving a motor vehicle auxiliary unit connected by means of a belt pulley arrangement. Preferred constructions of the invention are disclosed in the dependent claims.

According to the invention, a belt pulley arrangement for a belt drive for driving motor vehicle auxiliary units is provided with a belt pulley for introducing a torque that can be provided by means of a traction mechanism, a driven shaft for driving an auxiliary unit, in particular, coolant pump, an electric machine for torque transfer between the belt pulley and the driven shaft, wherein the electric machine has a rotor connected to the belt pulley and a stator connected to the driven shaft, wherein the electric machine can be connected electrically to an electrical energy source for accelerating the driven shaft and/or to an electrical energy sink for braking the driven shaft, a first rotational speed measurement device for detecting the time curve of the rotational speed of the belt pulley and/or a second rotational speed measurement device for detecting the time curve of the rotational speed of the driven shaft and a control device connected to the electrical energy source and/or to the electrical energy sink for controlling a time curve of the rotational speed of the driven shaft by a time limited electrical connection of the energy source and/or energy sink in reaction to the detected time curve of the rotational speed.

With the help of the electric machine formed by the rotor and the stator, the driven shaft can be coupled electromagnetically with the belt pulley, so that, through the influence of an electric and/or magnetic field formed between the rotor and the stator, the flow of power between the belt pulley and the driven shaft can be changed. In this way it is possible, in particular, to be able the operate the driven shaft below a permissible maximum rotational speed even at a high rotational speed of the belt pulley and/or above a provided minimum rotational speed even at a low rotational speed of the belt pulley. This flow of power that is between the belt pulley and the driven shaft and can be influenced by the electric machine makes it possible to design the auxiliary unit connected by means of the driven shaft not for the most unfavorable operating point, so that the auxiliary unit can have smaller dimensions and a it is possible to reduce the installation space for motor vehicle components, in particular, the installation space of motor vehicle auxiliary units that can be driven by means of the belt drive.

The energy source and/or energy sink can be connected to the windings of the rotor and/or the stator of the electric machine. The energy source and the energy sink can be, in particular, the same part, preferably a rechargeable battery (accumulator), for example, a motor vehicle battery. Preferably, electrical energy previously stored in the energy sink can be used as the energy source for accelerating the driven shaft. Through the input of electrical energy of the electric machine from the energy source and/or the output of electrical energy from the electric machine to the energy sink, the amount and/or sign of a rotational speed difference between the rotational speed of the belt pulley and the rotational speed of the driven shaft can be changed in a targeted way. For an input of electrical energy, the driven shaft can also be accelerated to the rotational speed introduced by the belt pulley, whereby the driven shaft overruns the belt pulley ("overrun mode"). For an output of electrical energy, the driven shaft can be braked relative to the rotational speed introduced by the belt pulley, whereby the driven shaft rotates slower than the belt pulley ("brake mode"). In brake mode, preferably an electrical load and/or electrical storage device can be connected to the electric machine. In particular, the electrical resistance of the connected load can be infinitely large, whereby essentially no drag torque is produced. In particular, the nominal rotational speed of the driven shaft can be decoupled from the rotational speed of the belt pulley. In particular, it is possible to generate electrical energy for an on-board power supply of the motor vehicle or for storage of the electrical energy by connecting the electric machine to the energy sink ("generator mode") or to recover ("capture") part of the braking power as electrical energy in a braking process of the motor vehicle.

With the help of the control device, the rotational speed curve of the driven shaft can be decoupled nearly arbitrarily from the rotational speed curve of the belt pulley. In this way, in particular, rotational speed fluctuations of a motor vehicle motor that have been transmitted completely or partially into the traction mechanism of the belt pulley arrangement are transmitted to the drive shaft in a time variable manner. In particular, rotational speed fluctuations occurring in the drive shaft can be phase-shifted relative to the rotational speed fluctuations of the belt pulley in which the amplitude is reduced, the frequency is changed, damped, and/or essentially completely canceled out. To control the desired rotational speed curve of the drive shaft, the rotational speed curve of the drive shaft detected by the second rotational speed measurement device can be considered by the control device, for example, to determine a suitable time point and/or a suitable period of the connection of the energy source and/or energy sink. With the help of the first rotational speed measurement device, a feed-forward control can be achieved in which expected changes of the rotational speed of the drive shaft can be detected at an early time and can be considered in the control of the rotational speed of the drive shaft.

The electric machine is operated, in particular, exclusively as an electromechanical converter. The electric machine is, for example, constructed as a direct current drive or alternating current drive. The electric machine can be, in particular, permanently excited or excited by an external source. In particular, it is possible to design the electric machine as a synchronous machine or asynchronous machine. The electric and/or magnetic field formed between the rotor and the stator can be changed, for example, in that the rotor can be shifted axially relative to the stator, so that the axial extent can change by means of which the parts relevant for transmitting the power flow, in particular, permanent magnets and/or windings, of the rotor and the stator are arranged overlapping each other in the radial direction. In particular, it is possible to shift the rotor axially relative to the stator so that a power transfer between the rotor and the stator can be interrupted, for example, to decouple the auxiliary unit connected by means of the driven shaft from the belt drive.

The rotor of the electric machine can rotate at the rotational speed of the belt pulley. The drive of the rotor is realized, in particular, by means of the belt pulley by a traction mechanism engaged with the belt pulley. The traction mechanism is constructed, in particular, as a belt, flat belt, V-belt, toothed belt, poly-V belt, cable, chain, or the like. With the help of one or more deflection rollers, the wraparound angle of the traction mechanism to the belt pulley can be increased and/or a pretension of the traction mechanism can be set. The stator of the electric machine can rotate at the rotational speed of the driven shaft. That is, in normal operation, both the rotor and also the stator rotate, wherein by influencing the electromagnetic field between the rotor and the stator, in particular, by an individually adjustable energizing of windings of the stator and/or the rotor, a rotational speed difference between the rotor and the stator can be increased or reduced, in particular, to be able to control a desired nominal rotational speed on the driven shaft. The desired nominal rotational speed of the driven shaft can be, in particular, variable and change during operation. For example, a desired volume flow of an auxiliary unit constructed as a coolant pump can be regulated as a function of the temperature of a motor vehicle component to be cooled by this coolant pump, so that the nominal rotational speed of the driven shaft connected to this coolant pump can change for adjusting the desired volume flow. If the auxiliary unit is not operated in the meantime, for example, the driven shaft can be mechanically or electrically blocked and power input into the auxiliary unit can be stopped. Preferably, the rotor can be connected to the driven shaft by means of an, in particular, switchable free wheel. This enables a power flow from the belt pulley to the driven shaft to be interrupted under certain operating conditions, without generating unnecessary reactive power by means of the electric machine or operating the auxiliary unit at least for a short time in a purely electrical manner, in particular, in a start-stop situation, a change-of-mind situation, or a starting of the motor vehicle motor for driving the motor vehicle. The auxiliary unit is, for example, a coolant pump, oil pump, compressor of an air conditioning system, fuel pump, alternator, lubricant pump, mechanical charger/compressor for charged air compression for supercharged motor vehicle motors.

In particular, the connected electrical power of the energy source and/or energy sink is variable, in particular, with an oscillating form. The electrical connection and disconnection of the energy source and/or energy sink can take place for providing a certain power basically according to the principle of pulse width modulation. Through a suitable power control, for example, with the help of a variable resistance, potentiometer, and/or transistor, intermediate values can also be easily provided in the electrical power and varied, in particular, continuously.

Advantageously, a switch element for producing an essentially rotationally locked coupling of the belt pulley to the driven shaft is provided in the case of a discontinued current flow in the electric machine. This produces a fail-safe functionality for the auxiliary unit, for example, in the event of a loss of the on-board power supply voltage, at least an unregulated operation of the auxiliary unit as a function of the rotational speed of the belt pulley. In this "fail-safe" operating mode, a purely mechanical coupling of the belt pulley to the driven shaft can be provided. For example, the switch element is constructed as an energized electromagnet that pretensions, in the energized state, a spring for creating a mechanical coupling of the belt pulley to the driven shaft. In the event of a loss of the power supply, the electromagnet can no longer pretension the spring, so that the spring is relaxed and, in particular, a friction-fit and/or positive-fit coupling of the belt pulley to the driven shaft is created.

In an especially preferred way, the electric machine has windings, wherein the winding can be short-circuited in the event of a disconnected current flow in the electric machine. The switch element for producing an essentially rotationally locked coupling of the belt pulley to the driven shaft in the event of a disconnected current flow in the electric machine can be constructed, for example, as a space-saving electrical circuit that short-circuits the windings when, for example, a supply of current via an on-board power supply of the motor vehicle fails. In the windings, in particular, an electrical current can be induced, in particular, from permanent magnets that can move relative to the windings and/or other energized windings, so that an electromagnetic coupling can be set between the rotor and the stator. Preferably, an additional mechanical coupling of the rotor to the stator can be provided.

In particular, the stator has permanent magnets and the rotor has windings or the stator has windings and the rotor has permanent magnets, wherein the windings are connected by means of a contactless or contacted electrical connection, in particular, sliding contact connection, to electrical lines for the input and/or output of electrical energy. Depending on the design and/or purpose of use, permanent magnets and windings can be interchanged. In principle, it is possible both for the stator and also for the rotor to provide windings that can be energized and regulated advantageously individually and independently of each other, in order to be able to achieve, in particular, many control options for the electric machine. If only one circuit is connected to the windings, only one individual electrical contact is required, for example, by means of the sliding contact connection, wherein, accordingly, little installation space is required. In an especially preferred way, a contactless electrical contact is provided in order to interchange electrical energy between the electrical lines and the rotor and/or stator without mechanical contact. Through the electrical contact, a power supply voltage can be applied, in order to operate the electric machine and/or to influence the electromagnetic field of the electric machine. Energizing the electric machine can here take place by means of an intermediate-connected electronic circuit that can be connected, on one side, to the electrical lines and, on the other side, to the at least one winding. The electronic circuit can, for example, chop, modulate, in particular, using pulse width modulation, the power supply voltage, and energize the at least one winding of the electric machine, wherein the energizing of the at least one winding can be controlled and/or regulated with the help of the electronic circuit.

Advantageously, the windings are connected to a carrier, wherein the carrier is connected by means of a connection piece running in the radial direction to the driven shaft or the belt pulley, wherein the carrier has, on the side facing away from the windings, a contact element for transmitting electrical energy, in particular, a slip ring or sliding contact connection. Furthermore, it is possible to use the driven shaft as a drive and the belt pulley as a driven part, so that the carrier and thus the windings can be connected to a drive shaft or a driven pulley. The electrical contact of the windings to the contact element can be realized by the material of the carrier. For example, the contact element, in particular, the slip ring, can be riveted to the carrier, wherein a rivet running through the material of the carrier can form and/or enable an electrical contact. Through the part of the carrier running in the radial direction with the help of the connection piece, the part carrying the contact element or the slip ring of the carrier connected to the driven shaft or to the belt pulley can be positioned at a distance to the driven shaft or to the belt pulley. In this way, between the contact element and the driven shaft or the belt pulley, a receptacle pocket can be formed in which, for example, spring-loaded contact brushes can be arranged. The contact brushes or other contact elements can be connected, in particular, to a stationary holder that can be inserted on one axial side of the belt pulley arrangement into the pocket defined by the carrier. The holder can be connected, in particular, to a unit housing of the auxiliary unit, wherein advantageously the unit housing of the auxiliary unit can project axially into the belt pulley and/or the belt pulley arrangement.

In an especially preferred way, the belt pulley has a radially outward pointing running surface for connecting the traction mechanism, wherein an electronic circuit for operating the electric machine is arranged radially within the running surface essentially at the axial height of the running surface. By means of the construction of the belt pulley for coupling with the traction mechanism, within the running surface of the belt pulley a hollow space is produced that can be used by the electronic circuit. Viewed radially from the outside, the electronic circuit can be covered essentially completely by the running surface. The electronic circuit can therefore be connected, in particular, rotationally locked to windings of the electric machine, for which the electronic circuit controls the input and/or output of electrical energy. Therefore, for operating the electric machine, it is not necessary to provide separate circuit electronics outside the belt pulley arrangement, wherein these electronics must be connected by means of sliding contacts or other forms of connection to the electric machine. This produces an installation space-saving construction for the belt pulley arrangement.

In particular, the belt pulley has a radially outward pointing running surface for connecting the traction mechanism, wherein the rotor and the stator of the electric machine are arranged radially within the running surface essentially at the height of the running surface. By means of the construction of the belt pulley for coupling with the traction mechanism, within the running surface of the belt pulley a hollow space is produced that can be used by the electric machine. Viewed radially from the outside, the electric machine can be covered essentially completely by the running surface. This produces an installation space-saving construction for the belt pulley arrangement.

The invention further relates to a use of a belt pulley arrangement that can be formed and refined as described above in a belt drive of a motor vehicle for the purposes of the output of a part of a torque provided by a motor vehicle motor for driving the motor vehicle to an auxiliary unit. Through the power flow that can be influenced by the electric machine between the belt pulley and the driven shaft, it is not necessary to design the auxiliary unit connected by means of the driven shaft for the least favorable operating point, so that through the use of the belt pulley arrangement for the output of the provided torque, the auxiliary unit can have smaller dimensions and the installation space for motor vehicle components, in particular, the installation space of motor vehicle auxiliary units that can be driven by means of the belt drive can be reduced.

The invention further relates to a belt drive for driving auxiliary units of a motor vehicle with an input belt pulley that can be connected to a motor shaft, in particular, crankshaft of a motor vehicle, at least one output belt pulley coupled by means of a common traction mechanism with the input belt pulley for driving the associated auxiliary unit, in particular, coolant pump, wherein at least one output belt pulley is constructed as a belt pulley arrangement that can be formed and refined as described above. Advantageously several output belt pulleys are provided, wherein, in particular, several, advantageously, all output belt pulleys are constructed as a belt pulley arrangement that can be formed and refined as described above. Through the power flow that can be influenced by the electric machine between the belt pulley and the driven shaft, it is not necessary to design the auxiliary unit connected by means of the driven shaft for the least favorable operating point, so that, through the belt drive, the auxiliary unit can have smaller dimensions and the installation space for motor vehicle components, in particular, the installation space of motor vehicle auxiliary units that can be driven by means of the belt drive can be reduced.

The invention further relates to a method for driving a motor vehicle auxiliary unit connected by means of a belt pulley arrangement that can be formed and refined as described above, in which the input of electrical energy into the electric machine and/or the output of electrical energy from the electric machine is performed as a function of a rotational speed of the belt pulley for controlling a time curve of the rotational speed of the driven shaft. Through the power flow that can be influenced by the electric machine between the belt pulley and the driven shaft it is not necessary to design the auxiliary unit connected by means of the driven shaft for the least favorable operating point, so that the auxiliary unit can have smaller dimensions and the installation space for motor vehicle components, in particular, the installation space of motor vehicle auxiliary units that can be driven by means of the belt drive can be reduced. Instead it is possible to design the auxiliary unit for an intended nominal rotational speed range and to control the intended nominal rotational speed range for each auxiliary unit through the influence of the power flow between the belt pulley and the driven shaft. The method can be formed and refined, in particular, as explained above with reference to the belt pulley arrangement.

In particular, the time curve of the rotational speed of the driven shaft is phase-shifted to the time curve of the rotational speed of the belt pulley. In this way a response can be produced to a demand of an auxiliary unit changed due to rotational speed fluctuations of a motor vehicle motor, of which a part of the torque is used for driving auxiliary units. For example, the phase shift of the rotational speed fluctuations can be provided such that the drive shaft of an auxiliary unit constructed as an oil pump provides to the oil pump a displacement quantity increased exactly under consideration of the response over the length of the pumped displacement path, when it is used due to the rotational speed fluctuation of the motor vehicle motor. Therefore the quantity of too much oil pumped for the sake of safety can be reduced, which increases effectiveness and energy efficiency.

Preferably, a maximum amplitude distance $A_1$ of the time curve of the rotational speed of the driven shaft relative to a nominal rotational speed is less than a maximum amplitude distance $A_2$ of the time curve of the rotational speed of the belt pulley relative to the nominal rotational speed, wherein, in particular, $0.00 \leq A_1/A_2 < 1.00$, preferably $0.01 \leq A_1/A_2 \leq 0.50$, more preferably $0.02 \leq A_1/A_2 \leq 0.10$, and especially preferred $0.03 \leq A_1/A_2 \leq 0.05$. Rotational speed fluctuations introduced by means of the belt pulley can therefore be damped or even essentially canceled out and then transmitted to the drive shaft. The maximum amplitude distance is understood to be, in a sinusoidal rotational speed fluctuation, the amplitude of a maximum or a minimum within a period around a middle value defining the nominal rotational speed. For an acceleration or braking it is possible that the nominal rotational speed is not constant, but instead changes, within a period. Non-sinusoidal rotational speed fluctuations can be approximately by a basically oscillating curve in order to determine the maximum amplitude distance.

BRIEF DESCRIPTION OF THE DRAWINGS

The invention is explained below using examples with reference to the accompanying drawings, wherein the features described below can depict an aspect of the invention both individually and also in combination. Shown are.

DETAILED DESCRIPTION OF THE PREFERRED EMBODIMENTS

Figure 1:
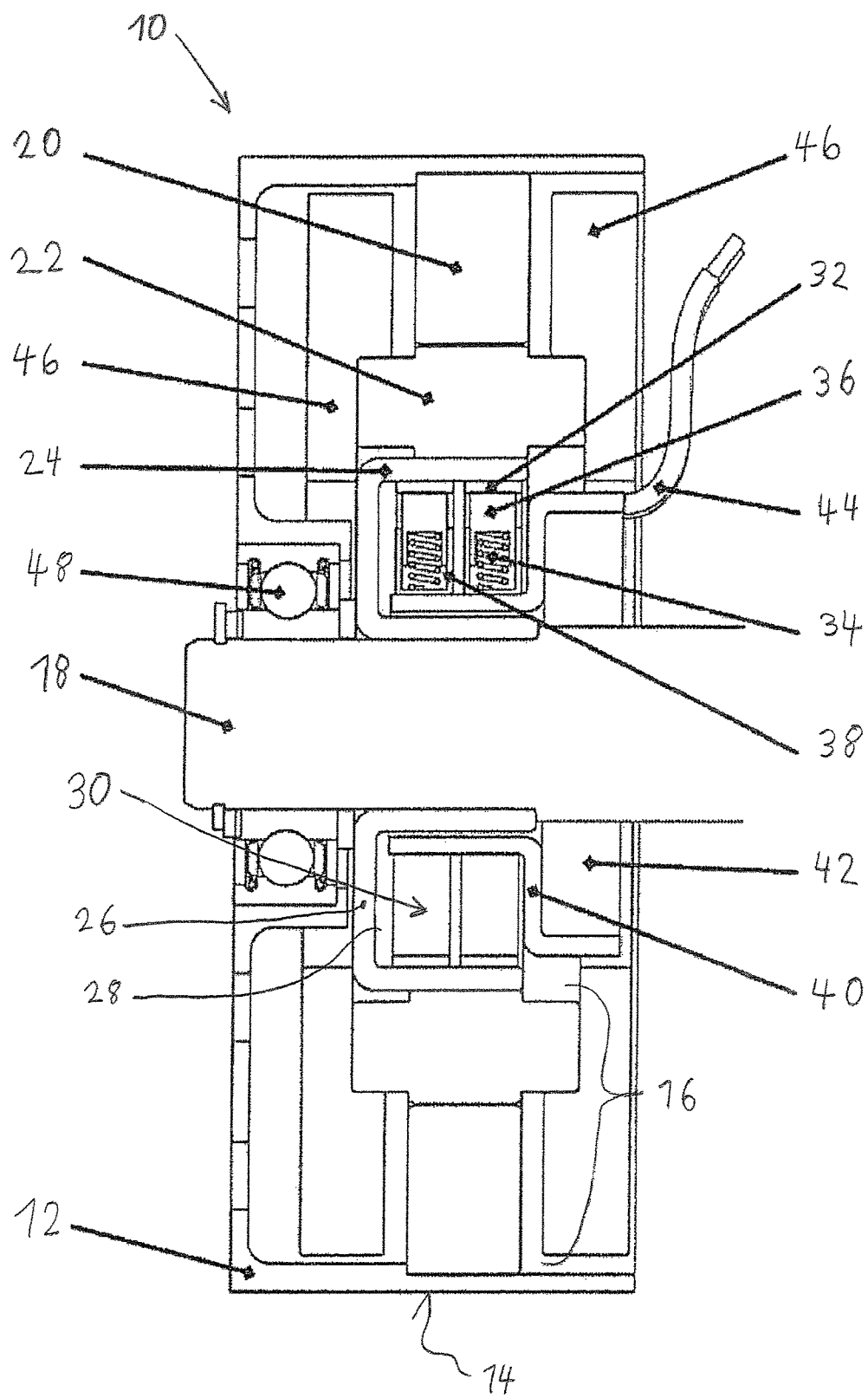
FIG. 1 a schematic sectional view of a belt pulley arrangement.

The belt pulley arrangement 10 shown in FIG. 1 has a belt pulley 12 with a running surface 14 that faces outward in the radial direction and by means of which a torque provided by a crankshaft of an internal combustion engine of a motor vehicle can be input to a traction mechanism, for example, flat belt. The belt pulley 12 is coupled by means of an electric machine 16 with a driven shaft 18 that can be an input shaft of an auxiliary unit, for example, a coolant pump. The electric machine 16 has a rotor 20 connected rigidly to the belt pulley 12 and a stator 22 arranged at a distance to the rotor 20 by means of an air gap. In the illustrated embodiment, the rotor 20 has permanent magnets while the stator 22 has windings. Furthermore, the stator 22 is connected rigidly to the driven shaft 18 by means of a carrier 24. The carrier 24 is constructed in a ring shape with an essentially U-shaped, axial open cross section. The carrier 24 has, on the base of the U-shaped cross section, a connection piece 26 running in the radial direction, so that a pocket 28 is formed between the stator 22 and the driven shaft 18, with a sliding contact connection 30 being provided in this pocket. The sliding contact connection 30 has slip rings 32 on the side facing away from the stator 22, with contact brushes 36 that are spring-loaded with compression springs 34 pressing against these slip rings, in order to create an electrical contact. The compression springs 34 and the contact brushes 36 connected to the compression springs 34 are guided in a contact brush guide 38. The contact brush guide 38 is connected to a stationary holder 40. The holder 40 can be connected, in particular, to a unit housing 42 of the auxiliary unit, wherein the unit housing 42 can project in the axial direction advantageously at least partially into the belt pulley 12 and/or the belt pulley arrangement 10. The holder 40 and/or the unit housing 42 can guide electrical lines 44 that can be connected electrically to the contact brushes 36. With the help of an electronic circuit 46 that is arranged completely within the belt pulley 12 and is mounted, in particular, with the carrier 24 or with the holder 40 or in a multiple-part construction with a first part with the carrier 24 and with a second part with the holder 40, an input and/or output of electrical energy can be controlled by means of the electrical lines 44, wherein the electromagnetic field between the rotor 20 and the stator 22 can be influenced. In this way it is possible, in particular, that the rotational speed of the driven shaft 18 deviates from the rotational speed of the belt pulley 12, in particular, in order to regulate an intended nominal rotational speed for the driven shaft 18 essentially independent of the rotational speed of the belt pulley 12. For this purpose, the belt pulley 12 is not connected rigidly to the driven shaft 18, but instead is supported so that it can move with relative rotation by means of a rolling bearing 48.

Figure 2:
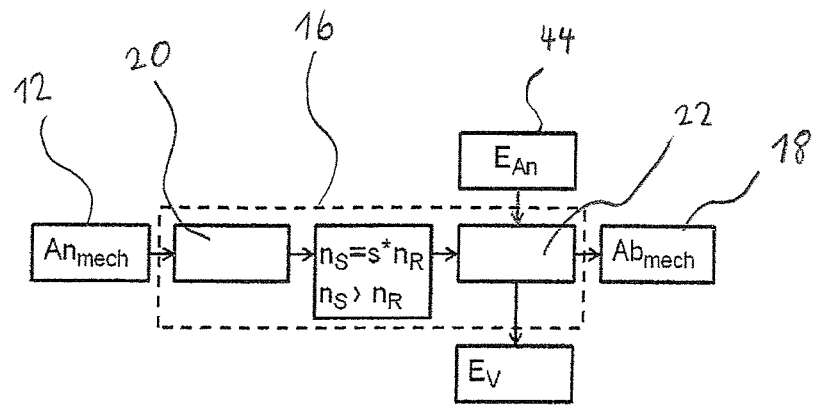
FIG. 2 a schematic block diagram of the belt pulley arrangement from FIG. 1 in an overrunning mode, FIG. 3 a schematic block diagram of the belt pulley arrangement from FIG. 1 in a fail-safe mode, FIG. 4 a schematic block diagram of the belt pulley arrangement from FIG. 1 in a braking mode, FIG. 5 a basic plot of rotational speeds occurring in the belt pulley arrangement shown in FIG. 1 in a first operating mode, FIG. 6 a basic plot of rotational speeds occurring in the belt pulley arrangement shown in FIG. 1 in a second operating mode, FIG. 7 a basic plot of rotational speeds occurring in the belt pulley arrangement shown in FIG. 1 in a third operating mode, and FIG. 8 a basic plot of rotational speeds occurring in the belt pulley arrangement shown in FIG. 1 in a fourth operating mode.

If electrical energy $E_{An}$ is input as shown in FIG. 2 into the electric machine 16 by means of the electrical lines 44, the driven shaft 18 can also be accelerated to the mechanical energy $An_{mech}$ input by means of the belt pulley 12, so that the stator 22 of the driven shaft 18 can rotate at a rotational speed $n_S$ that is greater by a factor s than the rotational speed $n_R$ of the rotor 20 of the belt pulley 12 ("overrun mode"). A small portion of the input energy is lost as loss energy $E_V$ and is not transmitted to the driven shaft 18, whereby the mechanical energy $Ab_{mech}$ output by the driven shaft 18 is somewhat smaller.

Figure 3:
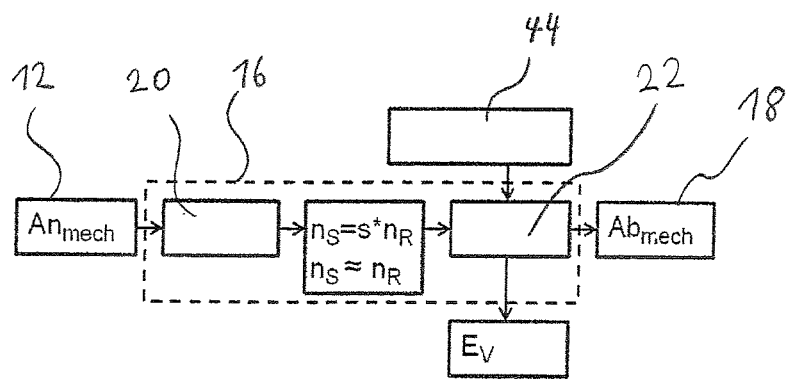

If electrical energy is input or output via the electrical lines 44 as shown in FIG. 3, in particular, the electronic circuit 46 can short-circuit the windings of the stator 22, so that the driven shaft 18 can rotate at a rotational speed $n_S$ that corresponds essentially approximately to the rotational speed $n_R$ of the rotor 20 ("fail-safe mode"). A small portion of the input energy is lost as loss energy $E_V$ and is not transmitted to the driven shaft 18, so that the rotational speed $n_S$ of the driven shaft 18 is, under consideration of the loss energy $E_V$, slightly smaller than the rotational speed $n_R$ of the rotor 20, whereby the mechanical energy $Ab_{mech}$ output by the driven shaft 18 is somewhat smaller. The loss energy $E_V$ is, however, typically so small that the factor s equals 1 to a good approximation.

Figure 4:
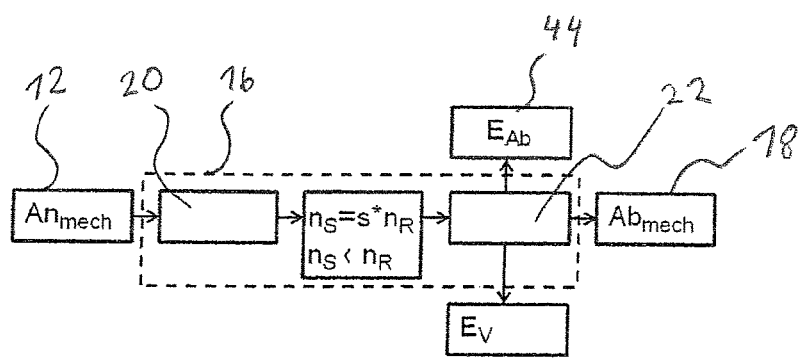

If electrical energy $E_{Ab}$ is output from the electric machine 16 via the electrical lines 44 as shown in FIG. 4, for example, to operate another electrical load and/or to store electrical energy that has been generated, the driven shaft 18 can be braked relative to the mechanical energy $An_{mech}$ input via the belt pulley 12, so that the driven shaft 18 can rotate at a rotational speed $n_S$ that is smaller than the rotational speed $n_R$ of the rotor 20 by a factor s ("brake mode"). A small portion of the energy input from the belt pulley 12 is lost as loss energy $E_V$ and is not transmitted via the electric machine 16 to the driven shaft 18, whereby the electrical energy $E_{Ab}$ that can be output by the electric machine 16 to the energy sink and mechanical energy $Ab_{mech}$ output by the driven shaft 18 are somewhat smaller.

Figure 5:
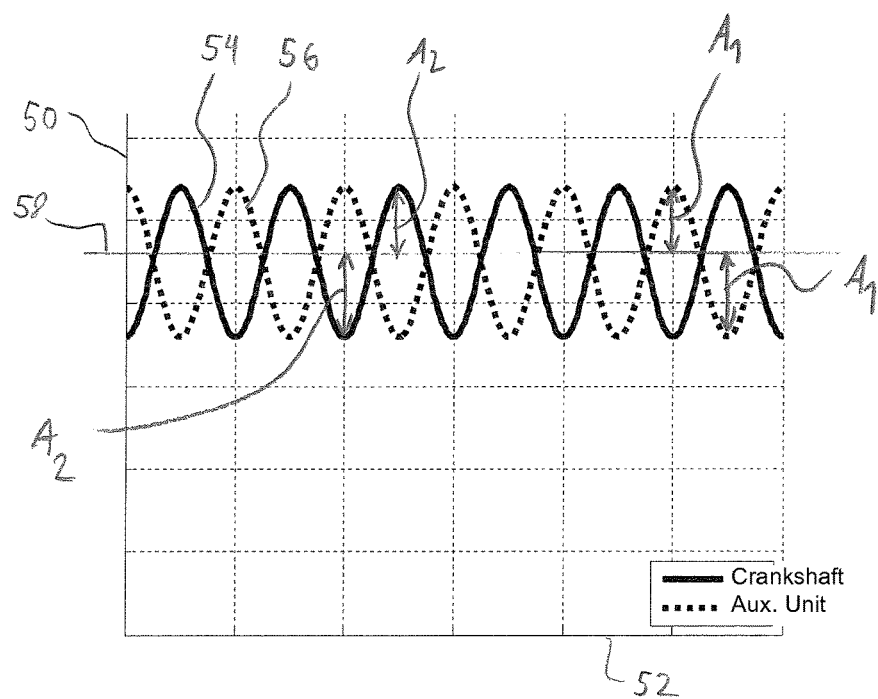

In the plot shown in FIG. 5, the rotational speed 50 is plotted versus time 52 and the rotational speed curve 54 of the belt pulley 12 and also the rotational speed curve 56 of the driven shaft 18 are shown. If the belt pulley arrangement 10 on the driven side of a belt drive driven by a motor vehicle crankshaft is used for driving auxiliary units, the rotational speed curve 54 of the belt pulley 12 essentially corresponds to the, if necessary, already damped rotational speed curve of the crankshaft ("KW") while the rotational speed curve 56 of the driven shaft 18 corresponds to the operating rotational speed of the associated auxiliary unit ("Agg"). In the shown embodiment, a rotational speed curve 54 of the belt pulley 12 is shown simplified with an essentially sinusoidal rotational oscillation by a nominal rotational speed 58, wherein, in real situations, the nominal rotational speed 58 can change with respect to time and/or the rotational oscillation can deviate from a pure sinusoid shape, for example, by the superposition of several different oscillations. In the shown first operating mode, the rotational speed curve 56 of the driven shaft 18 is phase-shifted by corresponding energy input and/or energy output of the electric machine 16 by approximately 90° relative to the rotational speed curve 54 of the belt pulley 12, so that oscillations that occur on mechanical components can be canceled out.

Figure 6:
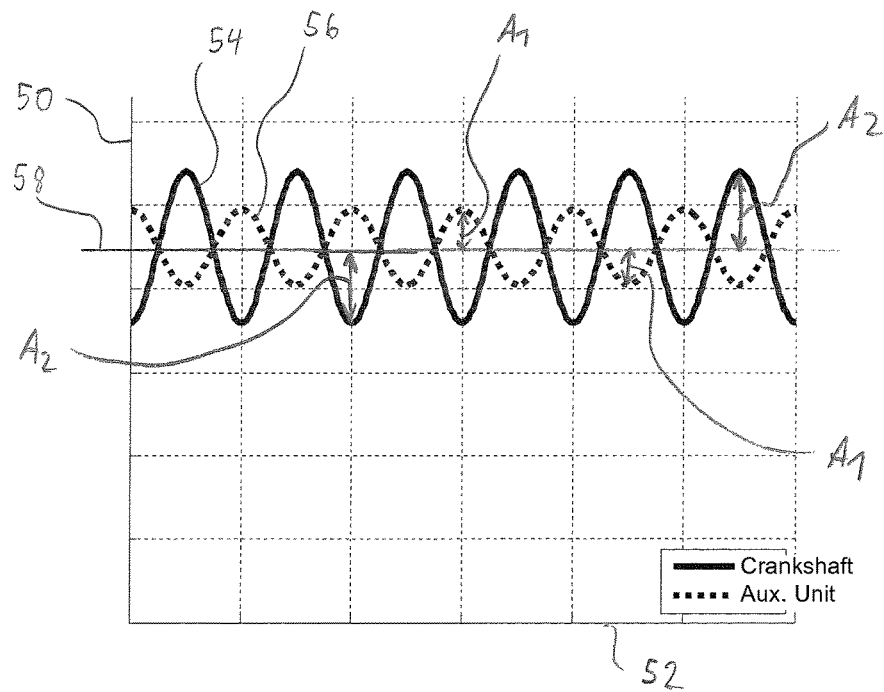

In comparison to the operating mode shown in FIG. 5, in the second operating mode shown in FIG. 6, the rotational speed curve 56 of the driven shaft 18 is also damped, so that a maximum amplitude distance $A_1$ of the rotational speed curve 56 of the driven shaft 18 relative to the nominal rotational speed 58 is less than a maximum amplitude distance $A_2$ of the rotational speed curve 54 of the belt pulley 12 relative to the nominal rotational speed 58. In the shown embodiment, in approximation $A_1/A_2=0.5$. The damping of the rotational speed curve 56 of the driven shaft 18 shown in FIG. 5 can also be independent of a phase shift or with a different phase shift of the rotational speed fluctuations in the rotational speed curve 54 of the belt pulley 12 and in the rotational speed curve 56 of the driven shaft 18.

Figure 7:
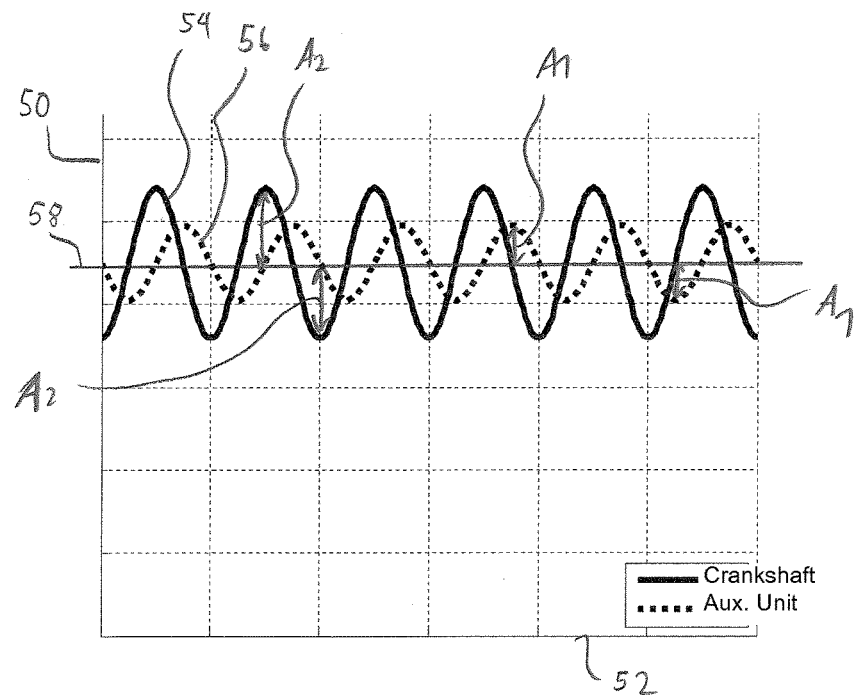

In comparison to the operating mode shown in FIG. 6, in the third operating mode shown in FIG. 7, the rotational speed curve 56 of the driven shaft 18 is shifted by a phase shift different from 90°.

Figure 8:
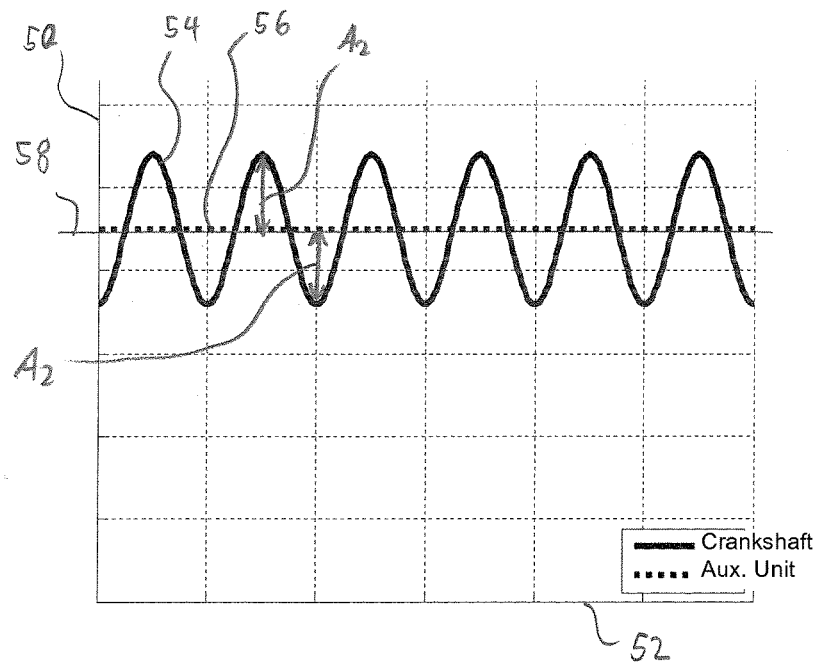

In comparison to the operating modes shown in FIG. 5, FIG. 6, and FIG. 7, in the third operating mode shown in FIG. 8, the rotational speed curve 56 of the driven shaft 18 is so strongly damped that all of the rotational speed fluctuations in the rotational speed curve 56 of the driven shaft 18 are essentially completely canceled out. The maximum amplitude distance $A_1$ of the rotational speed curve 56 of the driven shaft 18 to the nominal rotational speed 58 is essentially zero, so that, in the shown embodiment, in approximation, $A_1/A_2=0.0$. The rotational speed curve 56 of the driven shaft 18 therefore essentially coincides with the nominal rotational speed 58.

LIST OF REFERENCE NUMBERS

10 Belt pulley arrangement
12 Belt pulley
14 Running surface
16 Electric machine
18 Driven shaft
20 Rotor
22 Stator
24 Carrier
26 Connection piece
28 Pocket
30 Sliding contact connection
32 Slip ring
34 Compression spring
36 Contact brush
38 Contact brush guide
40 Holder
42 Unit housing
44 Electrical line
46 Electronic circuit
48 Roller bearing
50 Rotational speed
52 Time
54 Rotational speed curve of the belt pulley
56 Rotational speed curve of the driven shaft
58 Nominal rotational speed
$An_{mech}$ Input mechanical energy
$Ab_{mech}$ Output mechanical energy
$E_{An}$ Input electrical energy
$E_{Ab}$ Output electrical energy
$E_V$ Loss energy
$n_R$ Rotational speed of the rotor
$n_S$ Rotational speed of the stator
$A_1$ Maximum amplitude distance of the rotational speed curve of the driven shaft
$A_2$ Maximum amplitude distance of the rotational speed curve of the belt pulley

The invention claimed is:
1. A belt pulley arrangement for a belt drive for driving auxiliary units in a motor vehicle, comprising
a belt pulley for introducing a torque that is provided by a traction mechanism,
a driven shaft for driving an auxiliary unit,
an electric machine for transferring torque between the belt pulley and the driven shaft, wherein the electric machine has a rotor connected to the belt pulley and a stator connected to the driven shaft, wherein the electric machine has an electrical connection to an electrical energy source for accelerating the driven shaft and an electrical energy sink for braking the driven shaft, a first rotational speed measurement device that detects a time curve of a rotational speed of the belt pulley and a second rotational speed measurement device that detects a time curve of a rotational speed of the driven shaft, and a controller connected to at least one of the electrical energy source or the electrical energy sink that is configured to control the time curve of the rotational speed of the driven shaft through a time limited electrical connection of at least one of the energy source or energy sink in reaction to at least one of the detected time curves.

2. The belt pulley arrangement according to claim 1, wherein the electrical connection is variable.

3. The belt pulley arrangement according to claim 1, further comprising a switch element that provides an essentially rotationally locked coupling of the belt pulley to the driven shaft in case of a discontinued current flow for the electric machine.

4. The belt pulley arrangement according to claim 1, wherein the electric machine has windings, wherein the windings are short-circuited in case of a discontinued current flow for the electric machine.

5. The belt pulley arrangement according to claim 1, wherein the stator has permanent magnets and the rotor has windings or the stator has windings and the rotor has permanent magnets, and the windings are connected by a contactless or contacted electrical connection with electrical lines for at least one of an input or an output of electrical energy.

6. The belt pulley arrangement according to claim 5, wherein the windings are connected to a carrier, the carrier is connected by a connection piece running in a radial direction to the driven shaft or the belt pulley, the carrier has a contact element for transmitting electrical energy, comprising a slip ring of the sliding contact connection on a side pointing away from the windings.

7. The belt drive for driving auxiliary units of the motor vehicle comprising an input belt pulley that is connected to a motor shaft of the motor vehicle motor, at least one second output belt pulley coupled to the input belt pulley by a second traction mechanism for driving an allocated auxiliary unit of the auxiliary units, and at least one first output belt pulley that comprises the belt pulley arrangement according to claim 1.

8. A belt pulley arrangement for a belt drive for driving auxiliary units in a motor vehicle, comprising
a belt pulley for introducing a torque that is provided by a traction mechanism,
a driven shaft for driving an auxiliary unit,
an electric machine for transferring torque between the belt pulley and the driven shaft, wherein the electric machine has a rotor connected to the belt pulley and a stator connected to the driven shaft, wherein the electric machine is connected electrically to an electrical energy source for accelerating the driven shaft,
a first rotational speed measurement device that detects a time curve of a rotational speed of the belt pulley, and
a controller connected to the electrical energy source that is configured to control the time curve of the rotational speed of the driven shaft through a time limited electrical connection of the energy source in reaction to the detected time curve of the rotational speed.

9. The belt pulley arrangement of claim 8, further comprising a second rotational speed measurement device for detecting a time curve of a rotational speed of the driven shaft,
wherein the electric machine is connected electrically to an electrical energy sink for braking the driven shaft, and
wherein the controller is connected to the electrical energy sink and is configured to control the time curve of the rotational speed of the driven shaft through a time limited electrical connection of the energy sink in reaction to the detected time curve of the rotational speed.

10. A method for driving an auxiliary unit of the auxiliary units connected via the belt pulley arrangement according to claim 9, comprising in the motor vehicle, at least one of inputting electrical energy into the electric machine or outputting electrical energy from the electric machine as a function of the rotational speed of the belt pulley for controlling the time curve of the rotational speed of the driven shaft.

11. The method according to claim 10, wherein the time curve of the rotational speed of the driven shaft is phase-shifted relative to the time curve of the rotational speed of the belt pulley.

12. A belt pulley arrangement for a belt drive for driving auxiliary units in a motor vehicle, comprising
a belt pulley for introducing a torque that is provided by a traction mechanism,
a driven shaft for driving an auxiliary unit,
an electric machine for transferring torque between the belt pulley and the driven shaft, wherein the electric machine has a rotor connected to the belt pulley and a stator connected to the driven shaft, wherein the electric machine is connected electrically to an electrical energy sink for braking the driven shaft,
a second rotational speed measurement device for detecting a time curve of a rotational speed of the driven shaft, and
a controller connected to the electrical energy sink that is configured to control the time curve of the rotational speed of the driven shaft through a time limited electrical connection of the energy sink in reaction to the detected time curve of the rotational speed.

13. A method for driving an auxiliary unit connected via a belt pulley arrangement according to claim 12, comprising in a motor vehicle, at least one of inputting electrical energy into the electric machine or outputting electrical energy from the electric machine as a function of the rotational speed of the belt pulley for controlling the time curve of the rotational speed of the driven shaft,
wherein a maximum amplitude distance $A_1$ of the time curve of the rotational speed of the driven shaft with respect to a nominal rotational speed is less than a maximum amplitude $A_2$ of the time curve of the rotational speed of the belt pulley with respect to the nominal rotational speed.

14. The method according to claim 13, wherein $0.00 \leq A_1/A_2 \leq 1.00$.

15. The belt pulley arrangement of claim 12, further comprising
a first rotational speed measurement device that detects a time curve of a rotational speed of the belt pulley,
wherein the electric machine is connected electrically to an electrical energy source for accelerating the driven shaft, and wherein the controller is connected to the electrical energy source that is configured to control the time curve of the rotational speed of the driven shaft through a time limited electrical connection of the energy source in reaction to the detected time curve of the rotational speed.

* * * * *